United States Patent
Oikawa et al.

(10) Patent No.: US 11,066,579 B2
(45) Date of Patent: Jul. 20, 2021

(54) CURABLE COMPOSITION AND METHOD FOR REINFORCING SHAPED STRUCTURE WITH USE OF SAME

(71) Applicant: TOAGOSEI CO., LTD., Tokyo (JP)

(72) Inventors: Hiroshige Oikawa, Toyama (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 15/569,450

(22) PCT Filed: Apr. 26, 2016

(86) PCT No.: PCT/JP2016/063046
§ 371 (c)(1),
(2) Date: Oct. 26, 2017

(87) PCT Pub. No.: WO2016/175204
PCT Pub. Date: Nov. 3, 2016

(65) Prior Publication Data
US 2018/0298242 A1    Oct. 18, 2018

(30) Foreign Application Priority Data
Apr. 28, 2015   (JP) .............................. JP2015-090919

(51) Int. Cl.
| C09J 11/08 | (2006.01) |
| B33Y 70/00 | (2020.01) |
| C08K 5/101 | (2006.01) |
| C08F 2/44 | (2006.01) |
| C08L 83/10 | (2006.01) |
| B33Y 40/00 | (2020.01) |
| B29C 64/30 | (2017.01) |
| B05D 1/18 | (2006.01) |
| B05D 3/00 | (2006.01) |
| C09J 4/00 | (2006.01) |
| C09J 135/04 | (2006.01) |
| B29C 64/165 | (2017.01) |

(52) U.S. Cl.
CPC .............. *C09J 11/08* (2013.01); *B05D 1/18* (2013.01); *B05D 3/007* (2013.01); *B29C 64/30* (2017.08); *B33Y 40/00* (2014.12); *B33Y 70/00* (2014.12); *C08F 2/44* (2013.01); *C08K 5/101* (2013.01); *C08L 83/10* (2013.01); *C09J 4/00* (2013.01); *C09J 135/04* (2013.01); *B29C 64/165* (2017.08)

(58) Field of Classification Search
CPC . C09J 11/08; C09J 135/04; C09J 4/00; B33Y 40/00; B33Y 70/00; B05D 1/18; B05D 3/007; C08F 2/44; C08L 83/10; C08K 5/101; B29C 64/165; B29C 64/30
See application file for complete search history.

(56) References Cited

U.S. PATENT DOCUMENTS

| 3,968,186 A * | 7/1976 | Tomaschek ................ C09J 4/06 524/112 |
| 5,204,055 A | 4/1993 | Sachs et al. |
| 6,183,593 B1 | 2/2001 | Narang |
| 2002/0026982 A1 | 3/2002 | Bredt et al. |
| 2011/0234689 A1* | 9/2011 | Saito .................... C09D 11/326 347/21 |
| 2016/0304406 A1 | 10/2016 | Oikawa et al. |

FOREIGN PATENT DOCUMENTS

| CN | 103602122 A | 2/2014 |
| JP | S55-099980 A | 7/1980 |
| JP | S56-005807 A | 1/1981 |
| JP | S56-032571 A | 4/1981 |
| JP | S57-070169 A | 4/1982 |
| JP | S57-070171 A | 4/1982 |
| JP | H02-142875 A | 5/1990 |
| JP | H03-296581 A | 12/1991 |
| JP | H06-218712 A | 8/1994 |
| JP | 2000-053924 A | 2/2000 |
| JP | 2002-030269 A | 1/2002 |
| JP | 2002-528375 A | 9/2002 |
| WO | 2015/083725 A1 | 6/2015 |

OTHER PUBLICATIONS

International Search Report for PCT/JP2016/063046 dated Aug. 2, 2016, with English translation, (4 pages).
Written Opinion (Japanese) dated Aug. 2, 2016 in PCT/JP2016/063046.
Supplementary EPO Search Report dated Dec. 12, 2018 re EP appln. 16786481-8.
Office Action (with machine translation) issued against JP Appln. 2017-515553 apparently dated Nov. 26, 2018.
SIPO (PRC) first office action, issued apparently Jul. 3, 2019, in PRC appln 201680023647.3.
TW (ROC) Office Action dated Nov. 15, 2019 against corresponding TW Application No. 105112660 (4 pages).
Office Action issued against corresponding Chinese application No. 201680023647.3, dated Dec. 16, 2019.

* cited by examiner

*Primary Examiner* — Hai Y Zhang
(74) *Attorney, Agent, or Firm* — Fitch, Even, Tabin & Flannery, LLP

(57) ABSTRACT

This curable composition can easily reinforce shaped objects and the reinforced shaped objects have good color developability and excellent texture. The curable composition includes a 2-cyanoacrylic acid ester and a surface conditioner, in which the c content of the surface conditioner is 0.001-10 parts by mass relative to 100 parts by mass of the 2-cyanoacrylic acid ester, and the surface tension of the composition is 28 mN/m or less at 25° C. Preferred surface conditioners are silicone-based and fluorinated surface conditioners. Reinforced shaped objects and a method for reinforcing shaped objects using the curable composition are also provided.

10 Claims, No Drawings

CURABLE COMPOSITION AND METHOD FOR REINFORCING SHAPED STRUCTURE WITH USE OF SAME

CROSS-REFERENCE TO RELATED APPLICATIONS

This application is a U.S. national phase application filed under 35 U.S.C. § 371 of International Application No. PCT/JP2016/063046, filed Apr. 26, 2016, designating the United States, which claims priority from Japanese Patent Application No. 2015-090919, filed Apr. 28, 2015, and the complete disclosures of such applications are hereby incorporated herein by reference in their entirety for all purposes.

TECHNICAL FIELD

The present invention relates to a curable composition mainly composed of a 2-cyanoacrylic acid ester, and a method for reinforcing a shaped object using the same.

BACKGROUND ART

Recently, technologies for manufacturing models and components using three-dimensional modeling are quickly spreading. Three-dimensional modeling, which is a desktop process for making a desired object based on computer-aided design (CAD) data, is characterized in that it enables considerable reduction of the time from designing to production, production in small lots and customized manufacturing. Major methods of the three-dimensional modeling include stereolithographic process, sheet lamination process, and powder binding process.

Among the aforementioned processes, the powder binding process includes two types; one type which comprises fusing or sintering the powder by using lasers, and the other which comprises solidifying the powder using a binder. The latter method is based on an inkjet printing technology in which a binder is ejected onto selected areas of a powder comprising gypsum or the like as the main component, thereby creating a solidified sectional layer, and the thus-created sectional layers are piled up to obtain a three-dimensional shaped object (see, for instance, Patent Documents 1 and 2). The powder binding process using the inkjet printing technology does not need any high output laser required in the stereolithographic process but only needs an apparatus easy to handle; however, the resulting shaped object is sometimes insufficient in strength, requiring reinforcement by impregnation of a molten wax, varnish, polyurethane-based adhesive, epoxy-based adhesive, or 2-cyanoacrylate-based adhesive.

The aforementioned 2-cyanoacrylate-based adhesive is widely used as the so-called instantaneous adhesive since it quickly polymerizes and cures to bond various adherends due to its high anion polymerizability under the presence of an anion moiety such as moisture present on a surface of an adherend or in the air. Further, it is lower in viscosity among adhesives, and thus is known to be usable as an impregnating composition. For example, Patent Document 3 discloses that an impregnating composition which comprises a 2-cyanoacrylate, a 2-cyanoacrylate-soluble carboxylic acid with a pKa between 1.2 and 4.0 and an anion-polymerization promoter shows an excellent curability after impregnation into wooden materials or foamed materials. Further, Patent Document 4 describes an impregnating sealant composition which comprises a 2-cyanoacrylate, an anion-polymerization inhibitor, and a permeation promoter selected from derivatives of polyalkyleneoxides or polyoxyalkyleneoxides.

CONVENTIONAL TECHNICAL DOCUMENTS

Patent Documents

Patent Document 1: Japanese Patent Laid-open (Kokai) No. H06-218712.
Patent Document 2: Japanese Patent Laid-open (Kohyo) No. 2002-528375.
Patent Document 3: Japanese Patent Laid-open (Kokai) No. 2000-53924.
Patent Document 4: Japanese Patent Laid-open (Kokai) No. 2002-30269.

SUMMARY OF INVENTION

Problems to be Solved by the Invention

The shaped object produced using the three-dimensional modeling is used as not only a prototype but also an ornamental model, and thus its color and texture are often critical in addition to shape. However, a problem that a desired color cannot be obtained or the texture is degraded arises when the impregnating compositions described in Patent Documents 3 and 4 are applied to shaped objects. In particular, there is a problem that brightness of color is diminished when the above impregnating compositions are applied to shaped objects colored in red or the like and then cured.

The present invention is made in view of the above problems, and aims to provide a curable composition which not only can reinforce a shaped object easily but also can give a shaped object with good color developability and excellent texture, and also provide a method for reinforcing a shaped object using the same.

Means for Solving the Problems

The present inventors have found that a curable composition which comprises a 2-cyanoacrylic acid ester and a surface conditioner and has a surface tension of 28 mN/m or less at 25° C. provides a shaped object with good color developability and texture, and thus have completed the prevent invention.

That is, according to one aspect of the present invention, there is provided a curable composition comprising a 2-cyanoacrylic acid ester and a surface conditioner, in which the surface conditioner is contained in an amount of 0.001-10 parts by mass relative to 100 parts by mass of the 2-cyanoacrylic acid ester, the composition having a surface tension of 28 mN/m or less at 25° C.

According to a preferred embodiment of the present invention, the surface conditioner is a silicone-based surface conditioner.

According to another preferred embodiment of the present invention, the surface conditioner is at least one selected from the group consisting of polyether-modified polydimethylsiloxane and polyester-modified polydimethylsiloxane.

According to still another preferred embodiment of the present invention, the surface conditioner is a fluorinated surface conditioner.

In addition, according to another aspect of the present invention, there is provided a shaped object in which the above curable composition is used.

In addition, according to still another aspect of the present invention, there is provided a method for reinforcing a shaped object using the above curable composition, which comprises preparing a shaped object, and then applying the above curable composition to the above shaped object.

According to a preferred embodiment of the present invention, the above shaped object is formed of inorganic powder in the above reinforcing method.

Effect of the Invention

Since the present curable composition comprises a 2-cyanoacrylic acid ester and a surface conditioner, and has a surface tension of 28 mN/m or less, it can easily reinforce a shaped object and provides a shaped object with good color developability and excellent texture.

Furthermore, when the above surface conditioner is a silicone-based conditioner or fluorinated surface conditioner, the resulting shaped object becomes more excellent in color developability.

DESCRIPTION OF EMBODIMENTS

Hereinafter, embodiments of the present invention are described, but the present invention is not limited thereto.

The present curable composition is characterized in that it comprises a 2-cyanoacrylic acid ester and a surface conditioner, and the above surface conditioner is contained in an amount of 0.001-10 parts by mass relative to 100 parts by mass of the 2-cyaoacrylic acid ester, and the surface tension of the composition is 28 mN/m or less at 25° C.

As the 2-cyanoacrylic acid ester used in the present curable composition, can be used those conventionally used for 2-cyanoacrylate-based adhesive compositions. Concretely, mention may be made of the compounds represented by the following general formula (1) or the compounds represented by the following general formula (2).

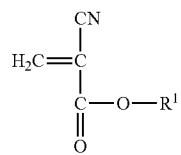

(1)

wherein $R^1$ represents a straight-chain or branched-chain alkyl group having from 1 to 12 carbon atoms, cycloalkyl group, allyl group, or aryl group; and

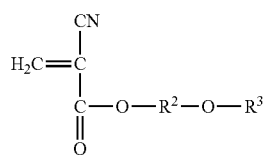

(2)

wherein $R^2$ represents an alkylene group having from 1 to 4 carbon atoms, and $R^3$ represents a straight-chain or branched-chain alkyl group having from 1 to 8 carbon atoms.

As the above-mentioned 2-cyanoacrylic acid ester represented by the general formula (1), there can be mentioned 2-cyanoacrylic acid ester of, for example, methyl, ethyl, n-propyl, i-propyl, allyl, n-butyl, i-butyl, n-pentyl, n-hexyl, cyclohexyl, phenyl, heptyl, 2-ethylhexyl, n-octyl, 2-octyl, n-nonyl, n-decyl, and n-dodecyl. Among them, $R^1$ is preferably a straight-chain or branched-chain alkyl group having from 3 to 12 carbon atoms or cycloalkyl group from the viewpoint of prevention of shaped objects from blooming and curability after impregnation. These 2-cyanoacrylic acid esters may be used alone or in a combination of two or more thereof.

Meanwhile, the blooming refers to a phenomenon of part or the whole of a substrate becoming white as a result of evaporation of uncured 2-cyanoacrylic acid ester contained in a curable composition that has been impregnated into the substrate such as a shaped object for reinforcement, followed by adhesion and deposition of the 2-cyanoacrylic acid ester as powders onto the periphery of the reinforced portions of the substrate.

As the above-mentioned 2-cyanoacrylic acid ester represented by the general formula (2), there can be mentioned ester of, for instance, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, hexoxymethyl, hexoxyethyl, hexoxypropyl, hexoxyisopropyl, hexoxybutyl, 2-ethylhexoxymethyl, 2-ethylhexoxyethyl, 2-ethylhexoxypropyl, 2-ethylhexoxyisopropyl, and 2-ethylhexoxybutyl. These 2-cyanoacrylic acid esters may be used alone or in a combination of two or more thereof.

Among the above 2-cyanoacrylic acid esters, the present curable composition may contain either the compound represented by the general formula (1) or the compound represented by the general formula (2), or may contain both as a mixture. When it contains both the compound represented by the general formula (1) which is fast in curability after impregnated into shaped objects and the compound represented by the general formula (2) which is flexible after cured, advantages result such that reinforced shaped objects can be prevented from blooming and can be easily processed by cutting. In the aforementioned mixture, the proportion of the compound represented by the general formula (1) is preferably in a range of from 5 to 90 mass %, and more preferably from 10 to 80 mass %, relative to the total of 2-cyanoacrylic acid ester. So long as the content of the compound represented by the general formula (1) is in the range of from 5 to 90 mass %, rapid hardening is attained upon impregnation, and a shaped object which is good particularly in cutting machinability can be obtained.

From the viewpoint of reinforcing effect and blooming prevention, preferred combinations of the compound represented by the general formula (1) with the compound represented by the general formula (2) include n-propyl 2-cyanoacrylate with methoxyethyl 2-cyanoacrylate, n-propyl 2-cyanoacrylate with ethoxyethyl 2-cyanoacrylate, i-propyl 2-cyanoacrylate with methoxyethyl 2-cyanoacrylate, i-propyl 2-cyanoacrylate with ethoxyethyl 2-cyanoacrylate, n-butyl 2-cyanoacrylate with methoxyethyl 2-cyanoacrylate, n-butyl 2-cyanoacrylate with ethoxyethyl 2-cyanoacrylate, i-butyl 2-cyanoacrylate with methoxyethyl 2-cyanoacrylate, i-butyl 2-cyanoacrylate with ethoxyethyl 2-cyanoacrylate, n-octyl 2-cyanoacrylate with methoxyethyl 2-cyanoacrylate, n-octyl 2-cyanoacrylate with ethoxyethyl 2-cyanoacrylate, 2-octyl 2-cyanoacrylate with methoxyethyl 2-cyanoacrylate, and 2-octyl 2-cyanoacrylate with ethoxyethyl 2-cyanoacrylate.

Another essential component of the present curable composition is a surface conditioner. The surface conditioner functions to lower surface tension of the curable composition so as to allow the curable composition to permeate into fine rugged surfaces of shaped objects and enhance color developability of the shaped objects. The surface conditioner is not superficially limited as long as it can lower the surface tension of the curable composition to 28 mN/m or less at 25° C., but is preferably one that is miscible with the 2-cyanoacrlic acid ester. As a preferred surface conditioner, can be used acrylic, vinylic, silicone-based or fluorinated surface conditioners, for example. From the view point of high capability of lowering surface tension, silicone-based surface conditioners and fluorinated surface conditioners are preferred. These surface conditioners may be used alone or in combination of two or more thereof.

As the silicone-based surface conditioner, can be used polydimethylsiloxanes and modified silicone-based ones resulting from modification of polydimethylsiloxanes. From the viewpoint of miscibility with 2-cyanoacrylic acid ester, polyether-modified polydimethylsiloxanes, polymethylalkylsiloxanes and polyester-modified polydimethylsiloxanes are preferred. Furthermore, by virtue of high capability of lowering surface tension, polyether-modified polydimethylsiloxanes and polyester-modified polydimethylsiloxanes are preferred. These modified silicone-based surface conditioners may be used alone or in combination of two or more.

The fluorinated surface conditioner includes fluorine-based surfactants such as fluorine-containing 2-cyanoacrylic acid esters having a perfluoroether group or fluoroalkoxyalkyl group, perfluoroalkyl ethylene oxide (EO) adducts, perfluoroalkylcarboxylic acids and perfluoroalkyl betaine.

The content of the surface conditioner in the curable composition should be 0.001-10 parts by mass relative to 100 parts by mass of 2-cyanoacrylic acid ester. The content of the surface conditioner is preferably 0.005-8 parts by mass, more preferably 0.01-6 parts by mass, and furthermore preferably 0.05-1 parts by mass. When the content is less than 0.001 part by mass, the surface tension of the curable composition cannot be lowered sufficiently, thereby degrading color developability. On the other hand, even when the content is more than 10 parts by mass, no improvement of color developability is seen, and besides a problem of considerably degrading liquid stability of the curable composition occurs.

The surface tension of the curable composition at 25° C. should be 28 mN/m or less. The surface tension is preferably 27 mN/m or less, and more preferably 25 mN/m or less. When the surface tension is more than 28 mN/m, the curable composition cannot permeate into fine rugged portions on the surface of substrates, thereby degrading color developability. Meanwhile, the surface tension of the composition is usually 15 mN/m or more.

The viscosity of the curable composition at 25° C. is preferably 1-1000 mPa·s, more preferably 1-500 mPa·s, and furthermore preferably 1-300 mPa·s. When the viscosity at 25° C. is within the range of 1-1000 mPa·s, the curable composition is excellent in impregnatability and achieves a high reinforcing effect. The viscosity of the curable composition can be adjusted by a blending ratio of the compound represented by the general formula (1) and the compound represented by the general formula (2), a thickening agent commonly used in 2-cyanoacrylate-based adhesives, contents of other additives or the like.

The curable composition used in the present invention may contain a plasticizer in addition to the above-mentioned 2-cyanoacrylic acid ester and surface conditioner. The plasticizer is a component which improves the cutting machinability of the hardened product of the curable composition, and may be any compound miscible with the 2-cyanoacrylic acid ester and having no adverse influence on polymerization and storage stability of the 2-cyanoacrylic ester. Examples of such a plasticizer include triethyl acetyl citrate, tributyl acetyl citrate, dimethyl glutarate, diethyl glutarate, dibutyl glutarate, dimethyl adipate, diethyl adipate, dibutyl adipate, dimethyl sebacate, diethyl sebacate, dibutyl sebacate, bis(2-ethylhexyl) sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphorate, 2-ethylhexylcyclohexyl carboxylate, diisobutyl fumarate, diisobutyl maleate, caproic acid triglyceride, 2-ethylhexyl benzoate, dipropylene glycol dibenzoate, trimethyl trimellitate, and trioctyl trimellitate. Preferred among them from the viewpoint of favorable miscibility with the 2-cyanoacrylic acid ester and high plasticizing efficiency are tributyl acetyl citrate, dimethyl adipate, dimethyl phthalate, 2-ethylhexyl benzoate, and dipropylene glycol dibenzoate. The plasticizers may be used alone or in a combination of two or more thereof.

The content of the plasticizers is preferably in a range of from 10 to 50 mass %, more preferably from 10 to 40 mass %, per 100 mass % of the total curable composition. So long as the content of the plasticizers is in the range of from 10 to 50 mass %, little influence is exerted on curability upon impregnation, improving cutting machinability of the reinforcing part.

In addition to the aforementioned components, the curable composition in the present invention may contain stabilizers, thickeners, hardening accelerators, colorants, fragrances, solvents, strength improvers, and others that have been conventionally blended in the compositions containing 2-cyanoacrylic acid ester, in proper quantities to the extent that does not impair the effect of the present invention.

The stabilizers include (1) anion polymerization inhibitors, such as sulfur dioxide, aliphatic sulfonic acids such as methanesulfonic acid, aromatic sulfonic acids such as p-toluenesulfonic acid, boron trifluoride diethyl ether, HBF4, and trialkyl borate; and (2) radical polymerization inhibitors, such as hydroquinone, hydroquinone monomethyl ether, t-butylcatechol, catechol, and pyrogallol. These stabilizers may be used alone, or in a combination of two or more thereof. The content of the stabilizers is preferably in a range of from 1 ppm to 1 part by mass, per 100 parts by mass of 2-cyanoacrylic acid ester.

The thickeners include, for example, polymethyl methacrylates, copolymers of methyl methacrylate and an acrylate, copolymers of methyl methacrylate and another methacrylate, acrylic rubbers, urethane rubbers, polyvinylchloride, polystyrene, cellulose esters, polyalkyl-2-cyanoacrylate, and ethylene-vinyl acetate copolymers. These thickeners may be used alone or in a combination of two or more thereof. The content of the thickeners is preferably in a range of from 0.1 to 20 parts by mass, per 100 parts by mass of 2-cyanoacrylic acid ester.

The hardening accelerators include, for example, polyalkylene oxides, crown ethers, silacrown ethers, calixarenes, oxacalixarenes, cyclodextrins, and pyrogallol-based cyclic compounds. These hardening accelerators may be used alone or in a combination of two or more thereof.

The polyalkylene oxides refer to polyalkylene oxides and the derivatives thereof; examples thereof include those disclosed in Japanese Patent Publication (Kokoku) No. S60-

37836, Japanese Patent Publication (Kokoku) No. H01-43790, Japanese Patent Laid-open (Kokai) No. S63-128088, and Japanese Patent Laid-open (Kokai) No. H03-167279.

As the polyalkylene oxides, there can be mentioned, for example, diethylene glycol, triethylene glycol, tetraethylene glycol, polyethylene glycol, polypropylene glycol, poly(1,3-propylene glycol), polytrimethylene oxide, polytetramethylene oxide, polyepichlorohydrin, poly1,3-bis(chloromethyl)butylene oxide, polytetramethylene glycol, poly 1,3-dioxolane, poly2,2-bis(chloromethyl)propylene oxide, ethylene oxide-propylene oxide block copolymers, polyglycerin such as diglycerin, triglycerin, and tetraglycerin, formaldehyde condensates, acetaldehyde condensates, trioxane polymers and various types of polyalkylene oxides commercially available as polyols for curing polyether type urethanes.

As derivatives of polyalkylene oxides, preferred representative examples include esters of the aforementioned polyalkylene oxides with acids, or ethers of the above polyalkylene oxides with hydroxyl-group containing compounds; however, they are not limited thereto, and those having a polyalkylene oxide structure within the molecule thereof, such as those having various types of substituents at terminals of the polyalkylene oxide, or those having another linkage portions inside the polyalkylene oxide may also be used.

Concrete examples of the esters of polyalkylene oxides include polyethylene glycol monoesters, polyethylene glycol diesters or polypropylene glycol diesters (wherein esters are, for example, acetates, trifluoroacetates, laurates, stearates, oleates, acrylates, or methacrylates), bisphenol A-polyalkylene oxide adducts (wherein alkylene is, for example, ethylene or propylene; and hereinafter, this means the same), hydrogenated bisphenol A-polyalkylene oxide adducts, trimethylolpropane-polyalkylene oxide adducts, glycerin-polyalkylene oxide adducts, polyoxyethylene sorbitan ester, tetraoleic acid-polyoxyethylene sorbitol, adipic acid-polyalkylene oxide adducts, trimellitic acid-polyalkylene oxide adducts, isocyanate compound-polyalkylene oxide adducts, phosphoric acid-polyalkylene oxide adducts, silicic acid-polyalkylene adducts, (polyoxyalkylene)polyphosphate, and the like.

As concrete examples of the ethers of polyalkylene oxides, there can be mentioned diethylene glycol monoalkyl ethers, diethylene glycol dialkyl ethers or polyethylene glycol monoalkyl ethers (wherein alkyl includes, for example, methyl, ethyl, propyl, butyl, lauryl, cetyl, stearyl, oleyl, and perfluoroalkyl), polyethylene glycol monoaryl ethers, polyethylene glycol dialkyl ethers or polypropylene glycol dialkyl ethers (wherein alkyl includes, for example, methyl, ethyl, propyl, and butyl), polyethylene glycol diaryl ethers (wherein aryl includes, for example, phenyl, octylphenyl, and nonylphenyl).

Examples of the crown ethers include those disclosed in, for instance, Japanese Patent Publication (Kokoku) No. S55-2238, Japanese Patent Laid-open (Kokai) No. H03-167279, and Japanese Patent Laid-open (Kokai) No. 2002-201436. Concrete examples thereof include 12-crown-4, 15-crown-5, 18-crown-6, benzo-12-crown-4, benzo-15-crown-5, benzo-18-crown-6, dibenzo-18-crown-6, dibenzo-15-crown-5, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6,1,2-vinylbenzo-15-crown-5, and 1,2-benzo-1,4-benzo-5-oxygen-20-crown-7.

Examples of the silacrown ethers include, for example, those disclosed in Japanese Patent Laid-open (Kokai) No. S60-168775. Concrete examples thereof include dimethyl-sila-11-crown-4, dimethylsila-14-crown-5, and dimethyl-sila-17-crown-6.

Examples of the calixarenes and oxacalixarenes include those disclosed in the respective specifications of U.S. Pat. Nos. 4,556,700, 4,636,539, 4,718,966, and 4,855,461.

Concrete examples thereof include
tetrakis(4-t-butyl-2-methylenephenoxy)ethyl acetate,
25,26,27,28-tetra-(2-oxo-2-ethoxy)-ethoxycalix[4]arene,
5,11,17,23,29,35-hexa-tert-butyl-37,38,39,40,41,42-hexa-hydroxycalix[6]arene,
37,38,39,40,41,42-hexahydroxycalix[6]arene,
37,38,39,40,41,42-hexa-(2-oxo-2-ethoxy)-ethoxycalix[6]arene, and
5,11,17,23,29,35,41,47-octa-tert-butyl-49,50,51,52,53,54,55,56-octa-(2-oxo-2-ethoxy)-ethoxycalix[8]arene.

Examples of the cyclodextrins include, for example, those disclosed in Japanese Patent Laid-open (Kohyo) No. H05-505835. Concrete examples thereof include α-, β-, or γ-cyclodextrins.

Examples of the pyrogallol-based cyclic compounds include compounds disclosed in Japanese Patent Laid-open (Kokai) No. 2000-191600. Concrete examples thereof include 3,4,5,10,11,12,17,18,19,24,25,26-dodecaethoxycarbomethoxy-C-1,C-8,C-15,C-22-tetramethyl[14]-metacyclophane.

The content of the aforementioned hardening accelerators is preferably in a range of from 50 ppm to 5 parts by mass, and more preferably from 100 ppm to 2 parts by mass per 100 parts by mass of 2-cyanoacrylic acid ester.

The present curable composition can be used for any substrate into which liquid can permeate, and can easily reinforce the substrate. Hereinafter, the method for reinforcing a shaped object will be explained, taking a three-dimensional shaped object as an example.

The three-dimensional shaped object may be one obtained by any process, but is preferably a three-dimensional shaped object obtained by use of the powder binding process. Powder used in the powder binding process is not specifically limited as long as it is used for the three-dimensional modeling. Examples thereof include thermoplastic resins such as polyethylene, polypropylene, polymethylpentene, polyvinyl chloride, polytetrafluoroethylene, polystyrene, polyethylene terephthalate, polybutylene terephthalate, polysulfone, and polyphenylene oxide; crosslinked resins such as unsaturated polyester, divinylbenzene polymer, divinylbenzene-styrene copolymer, divinylbenzene-(meth)acrylate copolymer, and diallyl phthalate polymer; inorganic compounds such as spherical silica, glass beads, glass fibers, glass ballons, alumina, zirconia, zirconium silicate, hydroxyapatite, silicon carbide, silicon nitride, sodium chloride, calcium chloride, calcium carbonate, and gypsum; silicone compounds; and organic-inorganic complex particles containing organic polymer main chain and polysiloxane main chain. These powders are properly selected depending on the strength and texture required for the shaped object; however, from the viewpoint of curability of the curable composition, preferred are inorganic compounds. Since adsorbed moisture or anion species are present on the inorganic compounds, the curable composition permeating into the powder rapidly hardens.

The maximum particle diameter of the powder particles should be smaller than the thickness of the layers constituting the three-dimensional shaped object; as powder particles are finer, thinner shaped objects can be produced. The average particle size of the powder is preferably in a range of from 1 to 300 µm, more preferably in a range of from 5 to 100 µm, and still more preferably from 10 to 50 µm.

Conventionally utilized organic binders and inorganic binders can be employed as the binder for use in the aforementioned powder binding process. The organic binders are those of various types of polymer resins, and concrete examples thereof include natural resins, natural resin derivatives, phenolic resins, xylene resins, urea resins, melamine resins, ketone resins, cumarone-indene resins, petroleum resins, terpene resins, cyclized rubbers, chlorinated rubbers, alkyd resins, polyamide resins, polyvinyl chloride resins, acrylic resins, vinyl chloride-vinyl acetate copolymer resins, polyester resins, polyvinyl acetate, polyvinyl alcohol, polyvinyl butyral, chlorinated polypropylene, styrene resins, epoxy resins, urethane resins, and cellulose derivatives. Silicate-based inorganic binder can be used when the powder is ceramic.

The method for reinforcing a shaped object according to the present invention comprises coating a surface of a shaped object obtained by the aforementioned powder binding process or the like with a curable composition, and curing the composition to wholly or partially reinforce the object. The coating method for the curable composition is not particularly limited, and may be applied in shapes such as dots, lines, and spirals. Otherwise, a spray may be used for spray coating. Furthermore, when the entire object is reinforced, the shaped object may be immersed into a liquid of the curable composition.

After coating the shaped object, targeted parts can be reinforced only if they are left to stand as they are because the curable composition used in the present invention is a one-component type composition that hardens at ordinary temperature. Hardening time varies depending upon the coating amount of the curable composition, and is usually several to several ten minutes for standing still before proceeding to the next step of cutting work, painting, and the like. Furthermore, to accelerate the hardening, a liquid containing a hardening accelerator may be sprayed onto the shaped object or the shaped object may be allowed to stand in a vessel under the atmosphere of a hardening accelerator. As a preferable type of the accelerator, an amine-based compound is effective, but the accelerator is not limited thereto as long as it is a compound enhancing curability of 2-cyanoacrylic acid ester.

EXAMPLES

Hereinafter, the present invention is explained in further detail by way of Examples, but the present invention is not particularly limited to these Examples to the extent of not departing from the gist of the present invention. In the description below, parts and percentages are based on mass unless otherwise mentioned.

1. Evaluation Method
(1) Viscosity
Viscosity was measured at 25° C. using E-type viscometer.
(2) Surface Tension
Surface tension of the curable composition was measured under an environment of 25° C., using an automatic surface tensiometer "CBVP-Z" (model name) manufactured by Kyowa Interface Science Co., Ltd. This device is a surface tension meter adopting the plate method.
(3) Color Developability
A red shaped object (20 mm height×100 mm width×10 mm thickness) was made using a 3D printer, Model "ZPrinter 450", manufactured by 3D Systems, Inc. from gypsum powder that was used together with a polyvinyl alcohol-based water-soluble resin as a binder. The shaped object was immersed into a liquid of a curable composition for one minute, and then was allowed to air dry at room temperature for 24 hours to obtain a reinforced shaped object (test piece).
The test piece was visually evaluated for color developability.
<Evaluation Criteria>
◯: The test piece was red as intended.
x: The test piece looked whitish as a whole or in part.
(4) Reinforcement Effect
One end of the same test piece as in the above item (3) was held with hand, and the other end was struck with hand to observe what resulted on the test piece for evaluation of the reinforcing effect as follows.
<Evaluation Criteria>
◯: No cracks were observed on the test piece.
x: Cracks generated on the test piece.
2. Method for Producing a Curable Composition Example 1

To 100 parts of ethyl 2-cyanoacrylate were blended 40 ppm of sulfur dioxide, 1000 ppm of hydroquinone and 0.3 part of a polyether-modified polydimethylsiloxane "BYK-UV3510" (Tradename) manufactured by BYK Japan KK as a surface conditioner, and were stirred under room temperature for 12 hours or more to produce a curable composition. The evaluation results are given in Table 1.

Examples 2-9 and Comparative Examples 1-4

Curable compositions were produced and evaluated in the same manner as in Example 1, except that types of 2-cyanoacrylic acid esters and surface conditioners were changed as shown in Table 1.
Abbreviations in Table 1 are as follows:
BYK-307: a polyether-modified polydimethylsiloxane manufactured by BYK Japan KK.
BYK-333: a polyether-modified polydimethylsiloxane manufactured by BYK Japan KK.
BYK-UV3570: a polyester-modified polydimethylsiloxane manufactured by BYK Japan KK.

TABLE 1

| | | Examples | | | | | | | | | Comparative Examples | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Composition | Ethyl 2-cyanoacrylate | 100 | | | 100 | | | | | | 100 | | | |
| | Isopropyl 2-cyanoacrylate | | 100 | | | 100 | 100 | 50 | 50 | 50 | | 100 | | 50 |
| | Ethoxyethyl 2-cyanoacrylate | | | 100 | | | | 50 | 50 | 50 | | | 100 | 50 |

TABLE 1-continued

| | | Examples | | | | | | | | | Comparative Examples | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| | BYK-UV3510 | 0.3 | 0.3 | 0.3 | | | | | 5 | 0.3 | | | | |
| | BYK-307 | | | | 1 | | | | | | | | | |
| | BYK-333 | | | | | 0.01 | | | | | | | | |
| | BYK-UV3570 | | | | | | 0.1 | | | | | 1 | | |
| Evaluation results | Viscosity (mPa · s) | 2 | 2 | 2 | 2 | 2 | 2 | 2 | 2 | 2 | 2 | 2 | 2 | 2 |
| | Surface tension (mN/m) | 22 | 25 | 22 | 22 | 27 | 27 | 21 | 23 | 26 | 34 | 30 | 35 | 30 |
| | Color developability | ○ | ○ | ○ | ○ | ○ | ○ | ○ | ○ | ○ | x | x | x | x |
| | Reinforcement effect | ○ | ○ | ○ | ○ | ○ | ○ | ○ | ○ | ○ | ○ | ○ | ○ | ○ |

Examples 10-17

Curable compositions were produced and evaluated in the same manner as in Example 1, except that types of 2-cyanoacrylic acid esters and surface conditioners were changed as shown in Table 2. Meanwhile, in Table 2, Comparative Examples 1-4 are the same as in Table 1.

Abbreviations in Table 2 are as follows:

MEGAFACE F-477: an oligomer containing fluorinated group, hydrophilic group and lipophilic group, manufactured by DIC Corporation.

MEGAFACE F-554: an oligomer containing fluorinated group and lipophilic group, manufactured by DIC Corporation.

MEGAFACE F-556: an oligomer containing fluorinated group, hydrophilic group and lipophilic group, manufactured by DIC Corporation.

MEGAFACE F-563: an oligomer containing fluorinated group and lipophilic group, manufactured by DIC Corporation.

TABLE 2

| | | Examples | | | | | | | | Comparative Examples | | | |
|---|---|---|---|---|---|---|---|---|---|---|---|---|---|
| | | 10 | 11 | 12 | 13 | 14 | 15 | 16 | 17 | 1 | 2 | 3 | 4 |
| Composition | Ethyl 2-cyanoacrylate | 100 | 100 | 100 | 100 | 100 | | | 50 | 100 | | | |
| | Isopropyl 2-cyanoacrylate | | | | | | 100 | | 50 | | 100 | | 50 |
| | Ethoxyethyl 2-cyanoacrylate | | | | | | | 100 | 50 | | | 100 | 50 |
| | MEGAFACE F-477 | 0.1 | | | | 1 | | | | | | | |
| | MEGAFACE F-554 | | 0.1 | | | | | | | | | | |
| | MEGAFACE F-556 | | | 0.1 | | | | | 0.1 | | | | |
| | MEGAFACE F-563 | | | | 0.1 | | 0.1 | 0.1 | | | | | |
| Evaluation results | Viscosity (mPa · s) | 2 | 2 | 2 | 2 | 2 | 2 | 2 | 2 | 2 | 2 | 2 | 2 |
| | Surface tension (mN/m) | 28 | 25 | 28 | 23 | 24 | 24 | 25 | 28 | 34 | 30 | 35 | 30 |
| | Color developability | ○ | ○ | ○ | ○ | ○ | ○ | ○ | ○ | x | x | x | x |
| | Reinforcement effect | ○ | ○ | ○ | ○ | ○ | ○ | ○ | ○ | ○ | ○ | ○ | ○ |

INDUSTRIAL APPLICABILITY

The present curable composition is a one-component type that hardens at ordinary temperature, and thus enables various substrates to be bonded, coated or reinforced without using a special apparatus. By applying the present curable composition to shaped objects, the objects can be easily reinforced. Furthermore, the resulting shaped objects are excellent in color developability and can be easily processed by cutting.

The invention claimed is:

1. A curable composition consisting essentially of as a polymerizable monomer, a 2-cyanoacrylic acid ester; and a surface conditioner, in which the surface conditioner is contained in an amount of 0.001-10 parts by mass relative to 100 parts by mass of the 2-cyanoacrylic acid ester and the composition has a surface tension of 28 mN/m or less at 25° C.

2. The curable composition according to claim 1, wherein the surface conditioner is a fluorinated surface conditioner.

3. The curable composition according to claim 2, wherein the surface conditioner is at least one selected from the group consisting of oligomers containing fluorinated group, hydrophilic group, and lipophilic group and oligomers containing a fluorinated group and a lipophilic group.

4. A curable composition according to claim 1, wherein the 2-cyanoacrylic acid ester comprises at least one compound selected from compounds represented by formula (1)

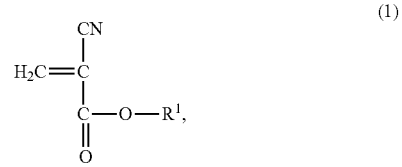

wherein $R^1$ represents a straight-chain or branched-chain alkyl group having from 1 to 12 carbon atoms, cycloalkyl group, allyl group, or aryl group, and compounds represented by formula (2):

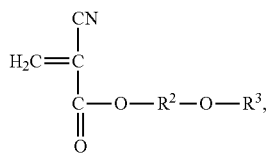

wherein $R^2$ represents an alkylene group having from 1 to 4 carbon atoms, and $R^3$ represents a straight-chain or branched-chain alkyl group having from 1 to 8 carbon atoms.

5. A curable composition according to claim 4, wherein the 2-cyanoacrylic acid ester comprises at least one compound selected from the compounds represented by formula (1).

6. The curable composition according to claim 1, wherein the curable composition further consisting essentially of a plasticizer.

7. The curable composition according to claim 1, wherein the curable composition further consisting essentially of a stabilizer.

8. The curable composition according to claim 1, wherein the curable composition further consisting essentially of a thickener.

9. The curable composition according to claim 1, wherein the curable composition further consisting essentially of a hardening accelerator.

10. The curable composition according to claim 1, wherein the curable composition further consisting essentially of at least one selected from the group consisting of a plasticizer, a stabilizer, a thickener and a hardening accelerator.

* * * * *